(12) United States Patent
Palaj et al.

(10) Patent No.: US 11,087,567 B2
(45) Date of Patent: Aug. 10, 2021

(54) SYSTEMS AND METHODS FOR AUXILIARY POWER UNIT HEALTH INDICATOR COMPUTATION

(71) Applicant: Honeywell International Inc., Morris Plains, NJ (US)

(72) Inventors: Lukas Palaj, Brno (CZ); Lukas Vesely, Prague (CZ); Jan Neuzil, Brno (CZ)

(73) Assignee: HONEYWELL INTERNATIONAL S.R.O., V Parku (CZ)

( * ) Notice: Subject to any disclaimer, the term of this patent is extended or adjusted under 35 U.S.C. 154(b) by 154 days.

(21) Appl. No.: 16/417,854

(22) Filed: May 21, 2019

(65) Prior Publication Data
US 2020/0372726 A1 Nov. 26, 2020

(51) Int. Cl.
| | | |
|---|---|---|
| *G07C 5/00* | (2006.01) | |
| *B64D 45/00* | (2006.01) | |
| *B64F 5/60* | (2017.01) | |
| *G05B 23/02* | (2006.01) | |
| *G07C 5/08* | (2006.01) | |

(52) U.S. Cl.
CPC .............. *G07C 5/006* (2013.01); *B64D 45/00* (2013.01); *B64F 5/60* (2017.01); *G05B 23/0254* (2013.01); *G07C 5/0816* (2013.01); *B64D 2045/0085* (2013.01)

(58) Field of Classification Search
CPC ......... G07C 5/006; G07C 5/0816; B64F 5/60; B64D 45/00; B64D 2045/0085; G05B 23/0254; G06Q 10/20
See application file for complete search history.

(56) References Cited

U.S. PATENT DOCUMENTS

| | | | | |
|---|---|---|---|---|
| 6,016,465 A | * | 1/2000 | Kelly | G05B 23/0235 376/215 |
| 6,574,537 B2 | * | 6/2003 | Kipersztok | G05B 23/0278 701/31.8 |
| 7,777,370 B2 | * | 8/2010 | Kojori | H03K 17/567 307/129 |
| 10,240,928 B2 | * | 3/2019 | Touchberry | G01C 21/10 |
| 2005/0222747 A1 | * | 10/2005 | Vhora | G05B 23/0254 701/100 |
| 2006/0144997 A1 | * | 7/2006 | Schmidt | G01G 19/07 244/100 R |

(Continued)

FOREIGN PATENT DOCUMENTS

| | | |
|---|---|---|
| CN | 109215165 A | 1/2019 |
| JP | 2013-019413 A | 1/2013 |

*Primary Examiner* — Mussa A Shaawat
(74) *Attorney, Agent, or Firm* — Bookoff McAndrews, PLLC

(57) ABSTRACT

Disclosed are systems, methods, and non-transitory computer-readable medium for determining an auxiliary power unit health indicator. The system may receive at least one field data of an auxiliary power unit, transforming the field data into at least one corrected field data, filtering the at least one corrected field data into at least one filtered field data, calculating at least one offset field data from the at least one filtered field data, determining a health indicator of the auxiliary power unit based on the at least one offset field data, and determining a maintenance procedure for the auxiliary unit based on the health indicator.

20 Claims, 4 Drawing Sheets

(56) References Cited

U.S. PATENT DOCUMENTS

| | | | |
|---|---|---|---|
| 2013/0179028 A1* | 7/2013 | Gu | G05B 23/0275 |
| | | | 701/29.4 |
| 2013/0197739 A1 | 8/2013 | Gallagher et al. | |
| 2016/0321594 A1* | 11/2016 | Linde | G06Q 10/06395 |
| 2017/0069145 A1* | 3/2017 | Dorkel | G05B 23/0254 |
| 2018/0045791 A1* | 2/2018 | Kalgren | G01R 31/40 |
| 2019/0013997 A1* | 1/2019 | Schwindt | H04L 41/06 |
| 2020/0026269 A1* | 1/2020 | Needham | G01R 31/343 |

* cited by examiner

SYSTEMS AND METHODS FOR AUXILIARY POWER UNIT HEALTH INDICATOR COMPUTATION

GOVERNMENT CONTRACT

The project leading to this application has received funding from the Clean Sky 2 Joint Undertaking under the European Union's Horizon 2020 research and innovation programme under grant agreement No 686782.

TECHNICAL FIELD

Various embodiments of the present disclosure generally relate to the field of an aircraft auxiliary power unit and, more particularly, to systems and methods for generating an auxiliary power unit health report of an aircraft.

BACKGROUND

Large aircraft often use an on-board auxiliary power unit (APU) to provide electrical power and compressed air for systems throughout the airplane. When the aircraft is grounded, the APU provides the main source of power for environmental control systems, hydraulic pumps, electrical systems and main engine starters. During flight, the APU can supply pneumatic and electric power. Other APU functions include charging the batteries. The APU Electronic Control Unit (ECU) controls the turbine engine by providing the control signals necessary to operate engine servos, valves and relays. The ECU also monitors engine operation using signals from several sensors mounted in the engine.

Auxiliary power units are generally small gas turbine engines, often mounted in the aft tail section of the aircraft. They require a certain amount of cooling air, and are lubricated by oil that is generally cooled by an oil cooler which also requires cooling air. Active cooling systems are usually employed to provide this cooling air, and are typically comprised of an active fan used to push air through the oil cooler and across auxiliary power unit components. These fans are driven at high speeds by the APU through a complex shaft and gear assembly. The mechanical complexity and high operating speeds of these fans increases the possibility of failure. Active fan cooling systems therefore can significantly reduce the reliability of an auxiliary power unit.

The air-worthiness of aircraft is dependent upon proper functioning of many interdependent aircraft components. The APUs are typically reliable but are subject to failure. An aircraft cannot take off if the APU is not functioning properly. Most often, to determine the cause of a failure of an APU, maintenance personnel use standard electronic test equipment, such as voltmeters, ohmmeters and oscilloscopes. However, traditional techniques for determining the health and failure of APUs involves a number of drawbacks.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed for automatically generating an auxiliary power unit health report of an aircraft.

In one embodiment, a computer-implemented method is disclosed for determining auxiliary power unit health indicator. The computer-implemented method may comprise: receiving, by one or more processors, at least one field data of an auxiliary power unit; transforming, by the one or more processors using an operating conditions correction, the at least one field data of the auxiliary power unit into at least one corrected field data; transforming, by the one or more processors using a filter, the at least one corrected field data into at least one filtered field data; transforming, by the one or more processors using an offset correction, the at least one filtered field data into at least one offset field data; determining, by the one or more processors, a health indictor of the auxiliary power unit based on the at least one offset field data; and determining, by the one or more processors, a maintenance procedure for the auxiliary unit based on the health indicator.

In accordance with another embodiment, a computer-implemented system is disclosed for determining Auxiliary Power Unit health indicator. The computer-implemented system may comprise: a memory having processor-readable instructions stored therein; and at least one processor configured to access the memory and execute the processor-readable instructions, which when executed by the at least one processor configures the at least one processor may perform: receiving at least one field data of an auxiliary power unit; transforming using an operating conditions correction, the at least one field data of the auxiliary power unit into at least one corrected field data; transforming using a filter, the at least one corrected field data into at least one filtered field data; transforming using an offset correction, the at least one filtered field data into at least one offset field data; determining a health indictor of the auxiliary power unit based on the at least one offset field data; and determining a maintenance procedure for the auxiliary unit based on the health indicator.

In accordance with another embodiment, a non-transitory computer-readable medium is disclosed for determining Auxiliary Power Unit health indicator. The non-transitory computer readable medium may comprise instructions for: receiving at least one field data of an auxiliary power unit; transforming using an operating conditions correction, the at least one field data of the auxiliary power unit into at least one corrected field data; transforming using a filter, the at least one corrected field data into at least one filtered field data; transforming using an offset correction, the at least one filtered field data into at least one offset field data; determining a health indictor of the auxiliary power unit based on the at least one offset field data; and determining a maintenance procedure for the auxiliary unit based on the health indicator.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
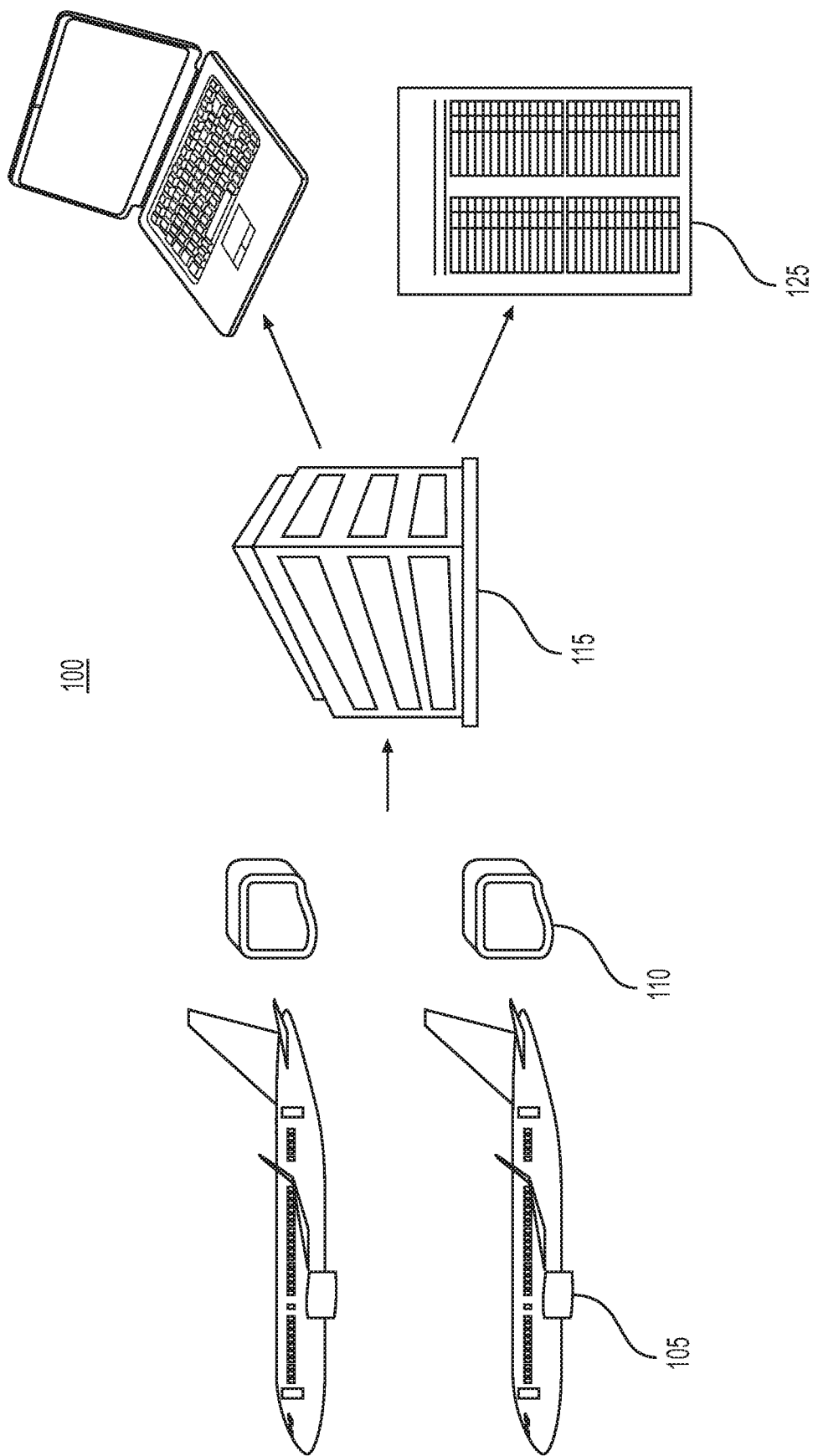
FIG. 1 depicts an overview of an exemplary system for automatically generating an auxiliary power unit health report, according to one aspect of the present disclosure.

The auxiliary power unit (APU) of an aircraft is an important system when the aircraft is on the ground to support various plane functions, for example, performing main engine start, powering the environmental control system (ECS), and keeping avionics functional. Maintenance of an APU including its accessories represents around 9% of the total aircraft components maintenance. More than 65% of APU removals are due to deteriorated power section (e.g. engine compressor, combustion chamber and turbine section). Like many other aircraft components, an APU has its specific performance indicators (e.g., measured or estimated variables that track the performance of the components) that are usually used for diagnostic and prognostic purposes. Precise diagnostics and prognostics require performance indicators that have the following properties: a) they are sensitive to component's degradation and insensitive to ambient and operation conditions and specific settings of the component (e.g. ambient temperature, power demand, etc.), and b) the level of deterioration should be trackable by a set of thresholds, such as specific values of performance indicators which correspond to specific deterioration levels. Aircraft components, such as the APU, typically are not expected to have self-healing properties and therefor the performance indicator is expected to be monotonically increasing or decreasing;

Aircraft components like the APU often represent a complex system utilized under wide range of conditions that makes achieving performance indicators with the above two properties a challenging task. One way this is solved is by correcting the measured variables using either general formulas with specific coefficients or pre-defined look-up tables. However, in both cases, prior empirical knowledge is required, and furthermore the correction is defined for the component in general and often does not consider manufacturing variability and deterioration state of the specific piece of component. Incorrect correction causes fluctuation of performance indicators and may result in inaccurate diagnostic or prognostic recommendations. Optimizing diagnostics and prognostics will lead to improved dispatch reliability, improved customer experience, and better maintenance service agreements settings with customers. Furthermore, a more precise diagnostic prognostic recommendation will result in more effective APU usage, such as prolonged time on wing while unchanged, and more efficient maintenance when the APU is removed off plane. Therefore, a need exists for a comprehensive approach for performance indicators computation.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 depicts an overview of an exemplary system 100 for automatically generating an auxiliary power unit health report, according to one aspect of the present disclosure.

In general, system 100 shows one or more aircraft 105, field data 110 collected from various sensors from the aircraft 105, one or more processing servers 115, and one or more APU health indicator reports 125. As shown in FIG. 1, aircraft 105 may transmit field data 110 from the aircraft 105 to the processing server 115. The transmission of field data 110 may be done while the aircraft 105 is in the air or while parked at a terminal. Field data 110 may be recorded using Aircraft Communications Addressing and Reporting System (ACARS) or an onboard gateway device, such as a Quick Access Recorder (QAR), configured to log and transmit raw recording of avionics data. However, in many cases, QAR or any other existing flight data 110 may be recorded during the flight using any conventional recording system, known in the art. Once the field data 110 is transmitted to the processing server 115, the processing server 115 may generate an APU heath indicator report 125. The APU health indicator report 125 may then be accessed by airline personnel via an online web portal, and/or may be sent to airline personnel via weekly emails.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Additionally, or alternatively, a set of devices (e.g., one or more devices) of environment 100 may perform one or more functions described as being performed by another set of devices of environment 100.

Figure 2:
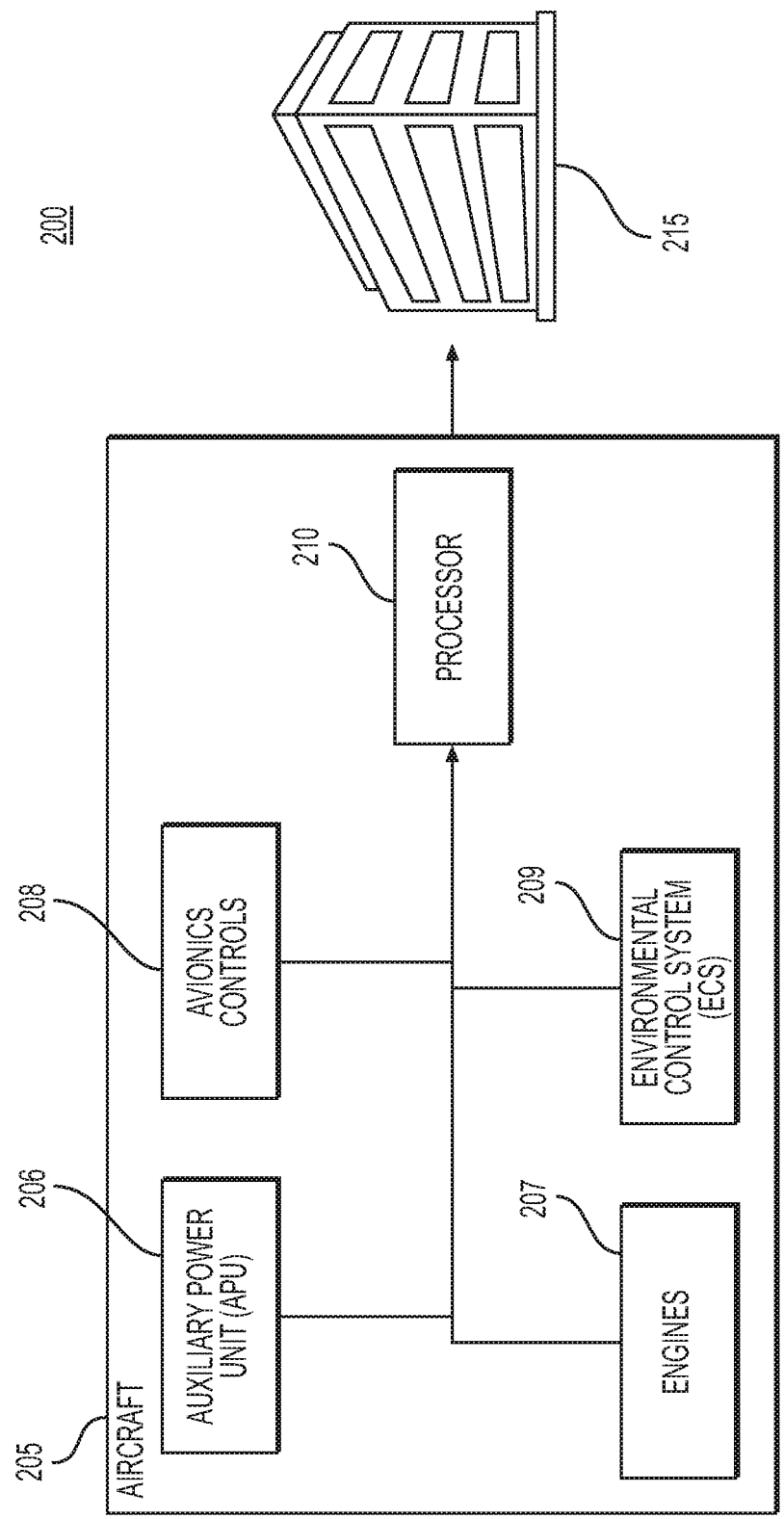
FIG. 2 depicts an overview of exemplary aircraft components for automatically generating an auxiliary power unit health report, according to one aspect of the present disclosure.

FIG. 2 depicts an overview of an exemplary aircraft components environment 200 for automatically generating an auxiliary power unit health report, according to one aspect of the present disclosure.

As showing in FIG. 2, environment 200 may include aircraft 205, which corresponds to aircraft 105 shown in FIG. 1, and processing server 215, which corresponds to the processing server 115 shown in FIG. 1. Aircraft 205 may further include an auxiliary power unit (APU) 206, one or more engines 207, avionics controls 208, environmental control system (ECS) 209, and processor 210. As disclosed above the APU 206 is an important system when an aircraft is on the ground to support starting the engines 207, powering the ECS 209, and keeping avionics 208 functional. Avionics controls 208 may be located in the cockpit of the aircraft 205. Avionics controls 208 may include communications, navigation, monitoring, aircraft flight control system, fuel systems, collision avoidance systems, flight recorders, weather systems, and aircraft management systems. The functions of the ECS 209 may include providing air supply and cabin pressure for both the crew and the passengers. While the aircraft is in the air, ECS 209 works by bleeding hot compressed air from the main engine compressor and transporting it via ducts to pressurization air conditioning kits. The APU 206, engines 207, avionics controls 208, and ECS 209 may transmit various measured field data to the processor 210. The processor 210 may generate the APU heath indicator report or the processor 210 may transmit the field data received to the processing server 215 where the APU health indicator report may also be generated.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of environment 200 may perform one or more functions described as being performed by another set of devices of environment 200.

Figure 3:
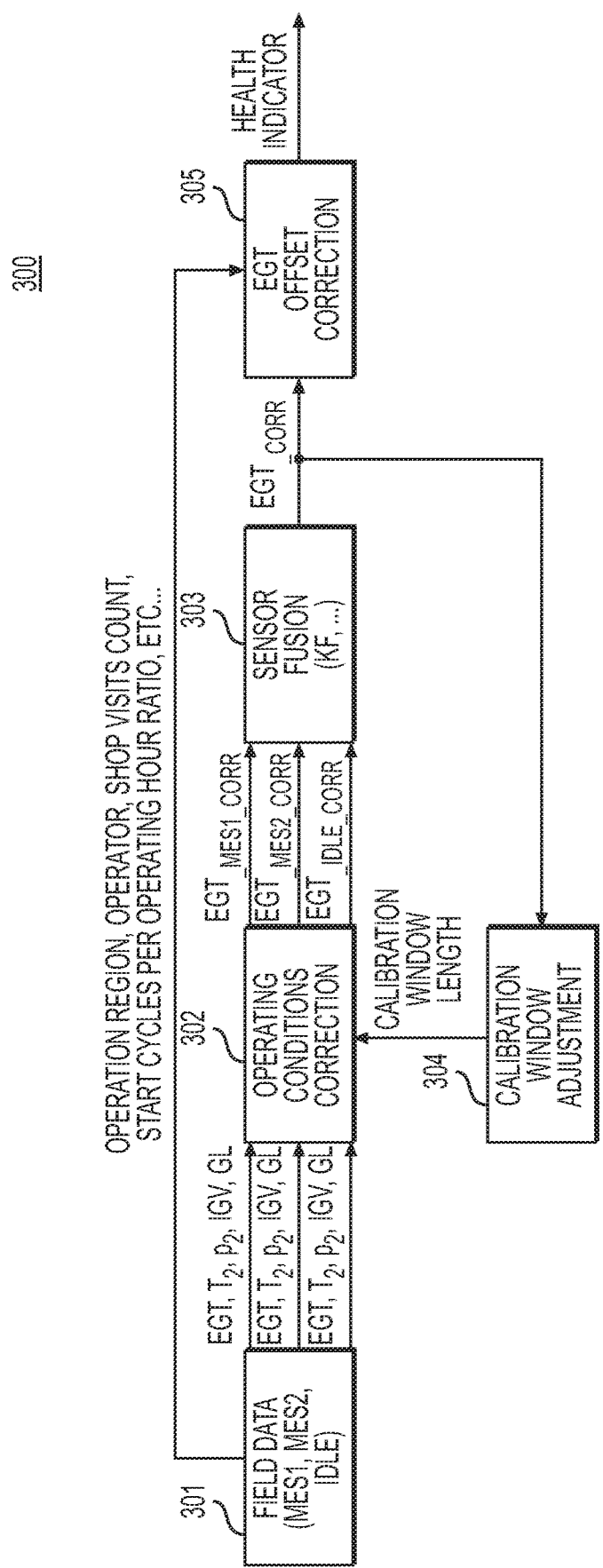
FIG. 3 depicts a flow chart of an exemplary method for generating an auxiliary power unit health report, according to one aspect of the present disclosure.

FIG. 3 depicts a flow chart of an exemplary method 300 for generating an auxiliary power unit health report, according to one aspect of the present disclosure.

Method 300 may begin at step 301 where field data are collected. The present technique makes use of wider range of available measured field data. The present technique uses not only data measured during Main Engine Start 1 (MES1), but may also use data measured during Main Engine Start 2 (MES2) and during APU idle. More specifically field data related to Exhaust Gas Temperature (EGT), the compressor inlet temperature ($T_2$), the compressor inlet pressure ($P_2$), compressor inlet guide vane position (IGV), and generator load ($L_{gen}$) may be collected and used in generating the APU heath indicator. The Exhaust Gas Temperature (EGT), the compressor inlet temperature ($T_2$) and the compressor inlet pressure ($P_2$) may be substituted by the corresponding field data measured in a preceding or a subsequent stage of APU, e.g. compressor inlet temperature may be substituted by APU inlet temperature, compressor inlet pressure may be substituted by APU inlet pressure.

The field data collected at step 301 may be fed into the operating conditions correction element at step 302. The operating conditions correction element involves automatic adjustment of coefficients used for operating conditions correction to capture manufacturing variability of the specific piece of APU. Due to manufacturing differences, each specific component or assembly of an APU may be different from each other. Therefore, one goal may be to provide condition indicators free from the influence of operation conditions such as ambient temperature T0, IGV settings, $L_{gen}$, and other relevant conditions. To accomplish that goal, the field data MES1, MES2, and APU Idle data may be fitted with linear or quadratic models, or any appropriate model known in the art. Each of the field data MES1, MES2, and APU Idle may be used to correct the exhaust gas temperature (EGT) and APU bleed pressure ($P_B$) to result in the following correction variables: $EGT_{\_MES1\_corr}$, $P_{B\_MES1\_corr}$, $EGT_{\_MES2\_corr}$, $P_{B\_MES2\_corr}$, $EGT_{\_IDLE\_corr}$, and $P_{B\_IDLE\_corr}$.

In an exemplary embodiment, a sequential least squares programming model may be used, and the corrected EGT and $P_B$ may be represented by the following formula:

$$EGT_{\_corr} = EGT_{\_meas} - a_T^*(T_2 - T_{ISA}) - b_T^*(p_0 - p_{ISA}) -$$
$$c_T^*(IGV - IGV_0) - d_T^*(L_{gen} - L_{gen\_0}) - w$$
$$= EGT_{\_meas} - \text{EGT\_Correction\_Model} - 2$$

$$p_{B\_corr} = p_{B\_meas} - a_p^*(T_0 - T_{ISA}) - b_p^*(p_0 - p_{ISA}) -$$
$$c_p^*(IGV - IGV_0) - w$$
$$= p_{B\_meas} - p_B\_\text{Correction\_Model} - w$$

$(T_{ISA} = 15 \deg C.; p_{ISA} = 14.696 \; psi;$
$IGV_0 = 92 \; deg; L_{gen} = 0\%; w \sim N(0, \sigma))$ After the correction variables have been calculated, then the variables $EGT_{\_MES1\_corr}$, $P_{B\_MES1\_corr}$, $EGT_{\_MES2\_corr}$, $P_{B\_MES2\_corr}$, $EGT_{\_IDLE\_corr}$, and $P_{B\_IDLE\_corr}$ may be transmitted to the sensor fusion element at step 303. The purpose of the sensor fusion element may be to utilize the field data MES1, MES2, and APU Idle data to provide one filtered value with improved precision of the performance indicators. The importance of the filtered data may be determined by the variance of the data, and may provide a framework for degradation model insertion. In one embodiment, the collected field data MES1, MES2, and APU Idle may be filtered using a median filter. The median filter is a non-linear digital filtering technique. The filtering technique runs through the field data entry by entry, replacing each entry with the median of neighboring entries. In another embodiment, the collected field data MES1, MES2, and APU Idle may be filtered using a Kalman filter. A Kalman filter is also known as linear quadratic estimation (LQE), which is an algorithm that uses a series of measurements observed over time and produces estimates of unknown variables by estimating a joint probability distribution over the variables for each timeframe, resulting in a variable that is more accurate than the field data. Although the median filter and Kalman filter are discussed above, other filtering methods known in the art may be used (e.g. Switching/Unscented Kalman filter). As the result of the filtering technique on the correction variables (e.g. $EGT_{\_MES1\_corr}$, $P_{B\_MES1\_corr}$, $EGT_{\_MES2\_corr}$, $P_{B\_MES2\_corr}$, $EGT_{\_IDLE\_corr}$, and $P_{B\_IDLE\_corr}$) the variable $EGT_{\_corr}$ may be produced.

Depending on the number of operation hours the APU has been in operation, a calibration adjustment may be completed at step 304 to calibrate the corrected EGT value produced by the filtering technique in step 303. When an APU is first put into service, for a first period of operational hours (OH), the APU hot section degradation may be constant and therefore the window of operation hours (OH) may be used to calibrate the corrected EGT value. The aircraft processor 210 may be utilized to detect the progress of hot section degradation; when the processor 210 determines that the degradation is no longer constant, the calibration window may be terminated. According to an exemplary embodiment, the adjustment of the calibration window may be performed by the following steps:

Step 1: define the window intervals variables
window_beg=0 OH, and window_end=$X_{init}$ OH.
Step 2: compute mean value of EGT for the interval
$EGT_{\_median\_init}$=median(EGT[window_beg . . . window_end])
Step 3: Update window interval variables
window_beg=window_end
window_end+=$X_{increase}$ OH
Step 4: compute median value of EGT for the interval
$EGT_{\_median}$=median(EGT[window_beg . . . window_end])
Step 5: If (($EGT_{\_median\_init}$−$EGT_{\_median}$)<$EGT_{threshold}$ deg C) AND (window_end<$X_{threshold}$ OH)
return to Step 3
else calibration is finished Once the calibration is completed, a set of correction coefficients may be output for use in the operating conditions correction element in step 302. In the exemplary embodiment disclosed above, the window interval variables are updated in 100 operational hour increments and the calibration window may be terminated at 2000 operational hours. It should be clear to one skilled in the art that the window interval variables may be in increments other than 100 operational hours and the calibration window may be terminated at more or less than 2000 operational hours.

Continuing from sensor fusion element at step 303, the corrected EGT variable $EGT_{\_corr}$ may be outputted and transmitted into EGT offset correction element at step 305. EGT offset correction may be used to define a specific threshold of performance indicator that may correspond with known state of APU health. This may be performed by application of specific offset correction that may be estimated by investigating the influence of numerous factors on the value of performance indicator corresponding to the state when the APU was removed from the aircraft 105 due to power section issues. Factors that may affect the variance of EGT values at the end of life cycle point may include start cycle per operating hour ratio, daily average use, repair and overhaul site, operator, number of shop visits, and most frequently operated climate region. To determine the offset values for each of the factors, data may be collected and examined based on each of the factors to identify the effects on reducing the standard deviation (STD) of EGT. The task of mapping the aforementioned factors with the offset value is the task of system identification and it can be solved by appropriate mathematical tool.

Health Indicator (HI) may then be computed from corrected EGT Corr variable $EGT_{\_corr}$ and the estimated Offset as, HI=Offset−$EGT_{\_corr}$. When the Health Indicator value approaches 0, it may be a representation that the health of the APU has deteriorated and that maintenance work may need to be performed.

An exemplary application of the EGT Offset Correction is illustrated in Table 1 and Table 2 below.

TABLE 1

EGT Corr. ($EGT_{\_corr}$) computed after sensor fusion at step 303

| Statistics | Unscheduled Removals EGT Corr. [deg. C] | Scheduled Removals EGT Corr. [deg. C] |
|---|---|---|
| Mean | 581.7 | 563.6 |
| STD | 32.1 | 26.0 |
| Median | 582.4 | 560.9 |
| IQR | 43.3 | 36.3 |

TABLE 2

HI computed after EGT Offset Correction is applied at step 305

| Statistics | Unscheduled Removals HI [deg. C] | Scheduled Removals HI [deg. C] |
|---|---|---|
| Mean | −2.7 | −9.9 |
| STD | 23.9 | 21.6 |
| Median | −0.1 | −7.7 |
| IQR | 26.2 | 25.8 |

As discussed above, the operating conditions correction element (step 302) and the EGT offset correction element (step 305) may directly affect the accurate determination of the health indicator. In step 302, data such as ambient temperature, inlet temperature, inlet pressure, inlet guide vanes setting, generator load may be used for operating conditions correction. In step 305, the offset correction value may be determined by estimating based on the influence of numerous factors (e.g. start cycle per operating hour ratio, daily average use, repair and overhaul site, operator, number of shop visits, and most frequently operated climate region) on the value of performance indicator corresponding to the state when the APU was removed from the aircraft 105 due to power section issues. To effectively handle the large amount of data sets that may be collected, a machine learning prognostic algorithm may be used to be trained on the data collected. Examples of the machine learning algorithms used may be ensemble decision trees, gradient boosting tree algorithm, hidden Markov models, support vector machine, similarity-based methods (match matrix), neuro-fuzzy system, or any other algorithms known in the art. As the amount of data that may be collected and trained using the machine learning prognostic algorithms increase, the accuracy of the operating conditions correction and EGT offset correction will also be improved.

Although FIG. 3 shows example blocks, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
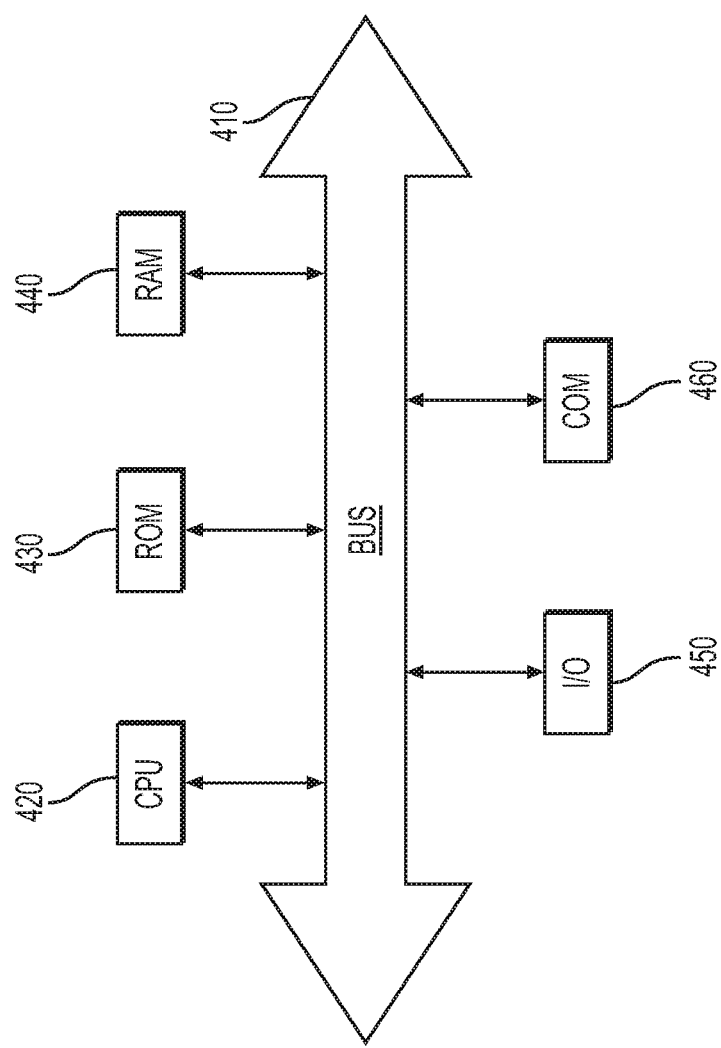
FIG. 4 depicts an exemplary computer device or system, in which embodiments of the present disclosure, or portions thereof, may be implemented.

FIG. 4 depicts a high-level functional block diagram of an exemplary computer device or system, in which embodiments of the present disclosure, or portions thereof, may be implemented, e.g., as computer-readable code. In some implementations, the processing servers 115 (depicted in FIG. 1) may correspond to device 400. Additionally, or alternatively, the aircraft processor 210 and processing servers 215 may each correspond to device 400. Additionally, each of the exemplary computer servers, databases, user interfaces, modules, and methods described above with respect to FIGS. 1-3 can be implemented in device 400 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-3.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-3, may be implemented using device 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, device 400 may include a central processing unit (CPU) 420. CPU 420 may be any type of processor device including, for example, any type of microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 may be connected to a data communication infrastructure 410, for example, a bus, message queue, network, or multi-core message-passing scheme.

Device 400 also may include a main memory 440, for example, random access memory (RAM), and also may include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 also may include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for determining Auxiliary Power Unit health indicator, the method comprising:
   receiving, by one or more processors, field data of an auxiliary power unit;
   transforming, by the one or more processors using an operating conditions correction, the field data of the auxiliary power unit into corrected field data;
   filtering, by the one or more processors, the corrected field data to obtain filtered field data;
   determining, by the one or more processors, offset field data at least based on the filtered field data and one or more offset correction parameters;
   determining, by the one or more processors, a health indicator of the auxiliary power unit based on the offset field data; and
   determining, by the one or more processors, a maintenance procedure for the auxiliary unit based on the health indicator.

2. The computer-implemented method of claim 1, wherein the transforming, by the one or more processors using the operating condition correction, the field data of the auxiliary power unit includes calculating the corrected field data based on one of a linear or a quadratic model.

3. The computer-implemented method of claim 1, wherein the field data includes ambient temperature, inlet temperature, inlet pressure, inlet guide vanes setting, generator load, and/or exhaust gas temperature.

4. The computer-implemented method of claim 1, further comprising:
   calculating, by the one or more processors during a calibration window, a calibration value using the offset field data, wherein the calibration window is adjustable based on a number of operational hours of the auxiliary power unit.

5. The computer-implemented method of claim 4, further comprising transforming, by the one or more processors using the operating conditions correction, the field data of the auxiliary power unit into corrected field data further based on the calibration value.

6. The computer-implemented method of claim 1, further comprising filtering the corrected field data using a median filter, a linear Kalman filter, a switching Kalman filter, and/or an unscented Kalman filter.

7. The computer-implemented method of claim 1, wherein the one or more offset correction parameters is calculated based on at least one of start cycles per operating hour ratio, daily average use, repair and overhaul site, operator, number of shop visits, and most frequently operated climate region.

8. A computer-implemented system for determining Auxiliary Power Unit health indicator, the computer-implemented system comprising:
   a memory having processor-readable instructions stored therein; and
   at least one processor configured to access the memory and execute the processor-readable instructions, which when executed by the at least one processor configures the at least one processor to perform a method including:
      receiving field data of an auxiliary power unit;
      transforming using an operating conditions correction, the field data of the auxiliary power unit into corrected field data;
      filtering, the corrected field data to obtain filtered field data;
      determining, offset field data at least based on the filtered field data and one or more offset correction parameters;
      determining a health indicator of the auxiliary power unit based on the offset field data; and
      determining a maintenance procedure for the auxiliary unit based on the health indicator.

9. The system of claim 8, wherein the transforming using the operating condition correction, the field data of the auxiliary power unit includes calculating the corrected field data based on one of a linear or a quadratic model.

10. The system of claim 8, wherein the field data includes ambient temperature, inlet temperature, inlet pressure, inlet guide vanes setting, generator load, and/or exhaust gas temperature.

11. The system of claim 8, further comprising:
   calculating, by the one or more processors during a calibration window, a calibration value using the offset field data, wherein the calibration window is adjustable based on a number of operational hours of the auxiliary power unit.

12. The system of claim 11, the method further including:
   transforming using the operating conditions correction, the field data of the auxiliary power unit into corrected field data further based on the calibration value.

13. The system of claim 8, the method
   filtering the corrected field data using a median filter, a linear Kalman filter, a switching Kalman filter, and/or an unscented Kalman filter.

14. The system of claim 8, wherein the one or more offset correction parameters is calculated based on at least one of start cycles per operating hour ratio, daily average use, repair and overhaul site, operator, number of shop visits, and most frequently operated climate region.

15. A non-transitory computer-readable medium for determining Auxiliary Power Unit health indicator, the non-transitory computer readable medium storing instructions that, when executed by at least one processor, cause the at least one processor to perform a method including:

receiving field data of an auxiliary power unit;

transforming using an operating conditions correction, the field data of the auxiliary power unit into corrected field data;

filtering, the corrected field data to obtain filtered field data;

determining, offset field data at least based on the filtered field data and one or more offset correction parameters;

determining a health indicator of the auxiliary power unit based on the offset field data; and determining a maintenance procedure for the auxiliary unit based on the health indicator.

16. The non-transitory computer-readable medium of claim 15, wherein the field data includes ambient temperature, inlet temperature, inlet pressure, inlet guide vanes setting, generator load, and/or exhaust gas temperature.

17. The non-transitory computer-readable medium of claim 15, further comprising:

calculating during a calibration window, a calibration value using the offset field data, wherein the calibration window is adjustable based on a number of operational hours of the auxiliary power unit.

18. The non-transitory computer-readable medium of claim 17, the method further including:

transforming using the operating conditions correction, the field data of the auxiliary power unit into corrected field data further based on the calibration value.

19. The non-transitory computer-readable medium of claim 15, the method further including:

filtering the corrected field data using a median filter, a linear Kalman filter, a switching Kalman filter, and/or an unscented Kalman filter.

20. The non-transitory computer-readable medium of claim 15, wherein the one or more offset correction parameters is calculated based on at least one of start cycles per operating hour ratio, daily average use, repair and overhaul site, operator, number of shop visits, and most frequently operated climate region.

* * * * *